No. 752,566. PATENTED FEB. 16, 1904.
A. KREBS.
DEVICE FOR LUBRICATING MOTORS AND MACHINERY DRIVEN THEREBY.
APPLICATION FILED MAY 8, 1903.
NO MODEL. 3 SHEETS—SHEET 1.

Witnesses.
Inventor,
Arthur Krebs.
By James L. Norris.
Atty.

No. 752,566. PATENTED FEB. 16, 1904.
A. KREBS.
DEVICE FOR LUBRICATING MOTORS AND MACHINERY DRIVEN THEREBY.
APPLICATION FILED MAY 8, 1903.
NO MODEL. 3 SHEETS—SHEET 3.

Witnesses. Inventor.
Arthur Krebs.
By James L. Norris.
Atty.

No. 752,566. Patented February 16, 1904.

UNITED STATES PATENT OFFICE.

ARTHUR KREBS, OF PARIS, FRANCE, ASSIGNOR TO SOCIÉTÉ ANONYME DES ANCIENS ETABLISSEMENTS PANHARD ET LEVASSOR, OF PARIS, FRANCE.

DEVICE FOR LUBRICATING MOTORS AND MACHINERY DRIVEN THEREBY.

SPECIFICATION forming part of Letters Patent No. 752,566, dated February 16, 1904.

Application filed May 8, 1903. Serial No. 156,311. (No model.)

*To all whom it may concern:*

Be it known that I, ARTHUR KREBS, engineer, a citizen of the French Republic, residing at Paris, Department of the Seine, France, (and having post-office address 19 Avenue d'Tory, in the said city,) have invented certain new and useful Improvements in Devices for Lubricating Motors and Machinery Driven Thereby, of which the following is a specification.

My invention relates to a device for lubricating motors and the machinery driven thereby; and it consists in utilizing the energy contained in the exhaust-gases for the purpose of conducting the lubricating-oil to the various parts requiring lubrication and in apparatus therefor.

In an explosion-engine such as is applied to a motor-car, for example, an exhaust-pipe leads the exhaust-gases from the exhaust-valve to the silencer. In applying my invention to such an engine I lead a pipe from the exhaust-pipe to an apparatus containing the lubricating-oil and cause these gases to operate upon a series of pistons which pump oil from the oil-reservoir through suitable pipes and valves to the various parts requiring lubrication. The movement of one or more of these pistons is utilized to force lubricating-oil to a drip-feed lubricator, from which oil is fed to some of the parts of the machinery requiring lubrication and from which lubricator also oil is fed through a pipe or pipes to a second piston or series of pistons used to force it to other parts of the machinery. An auxiliary hand-pump and the necessary pipes and valves are provided to permit of the lubrication of the various parts manually when the automatic lubrication ceases or is insufficient.

In order that my invention may be clearly understood, I shall describe a peculiar application for lubricating the bearing-blocks of a driving-shaft, the cylinders, and the casing containing the change-gear; but this particular disposition may be varied, if required.

Figure 1:
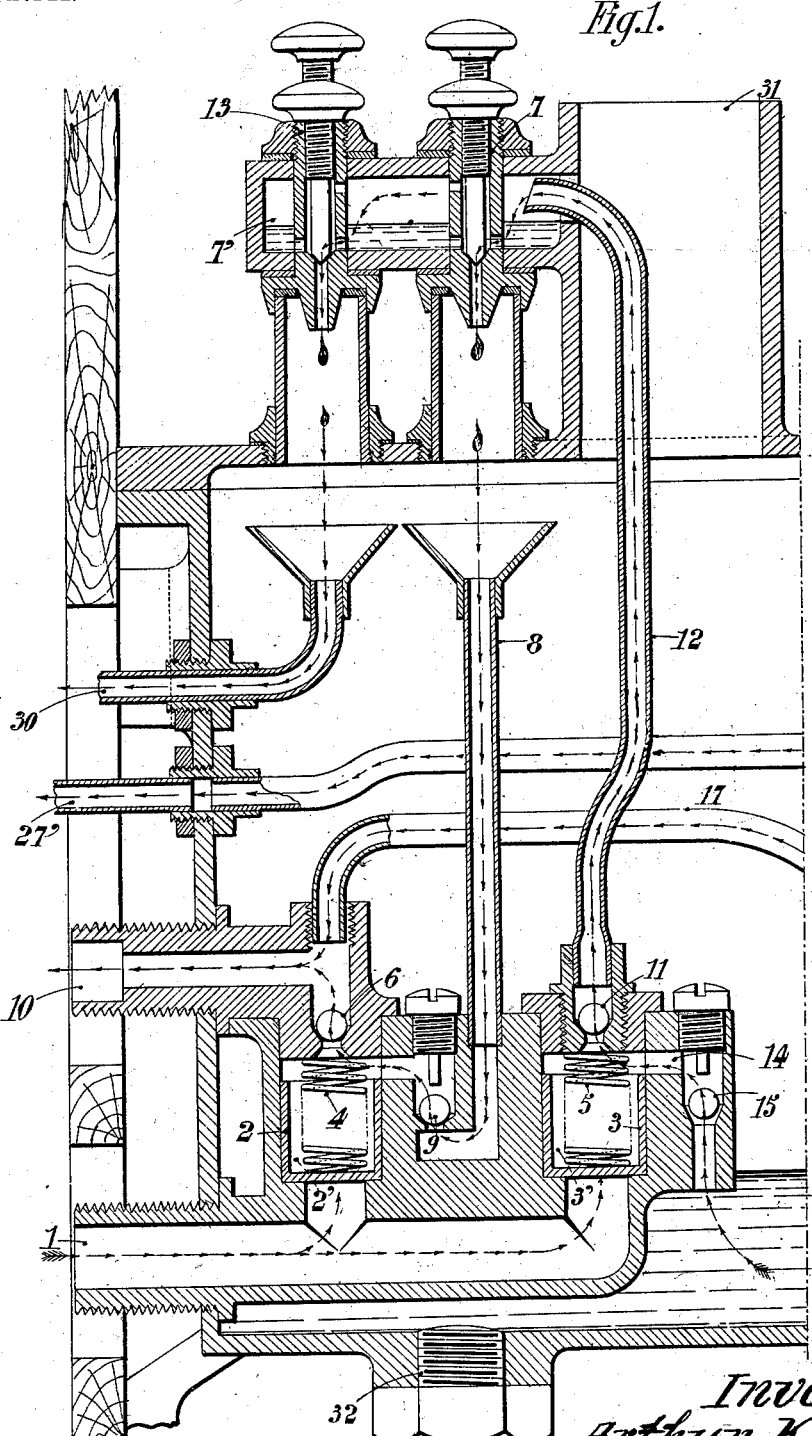
Figure 2:
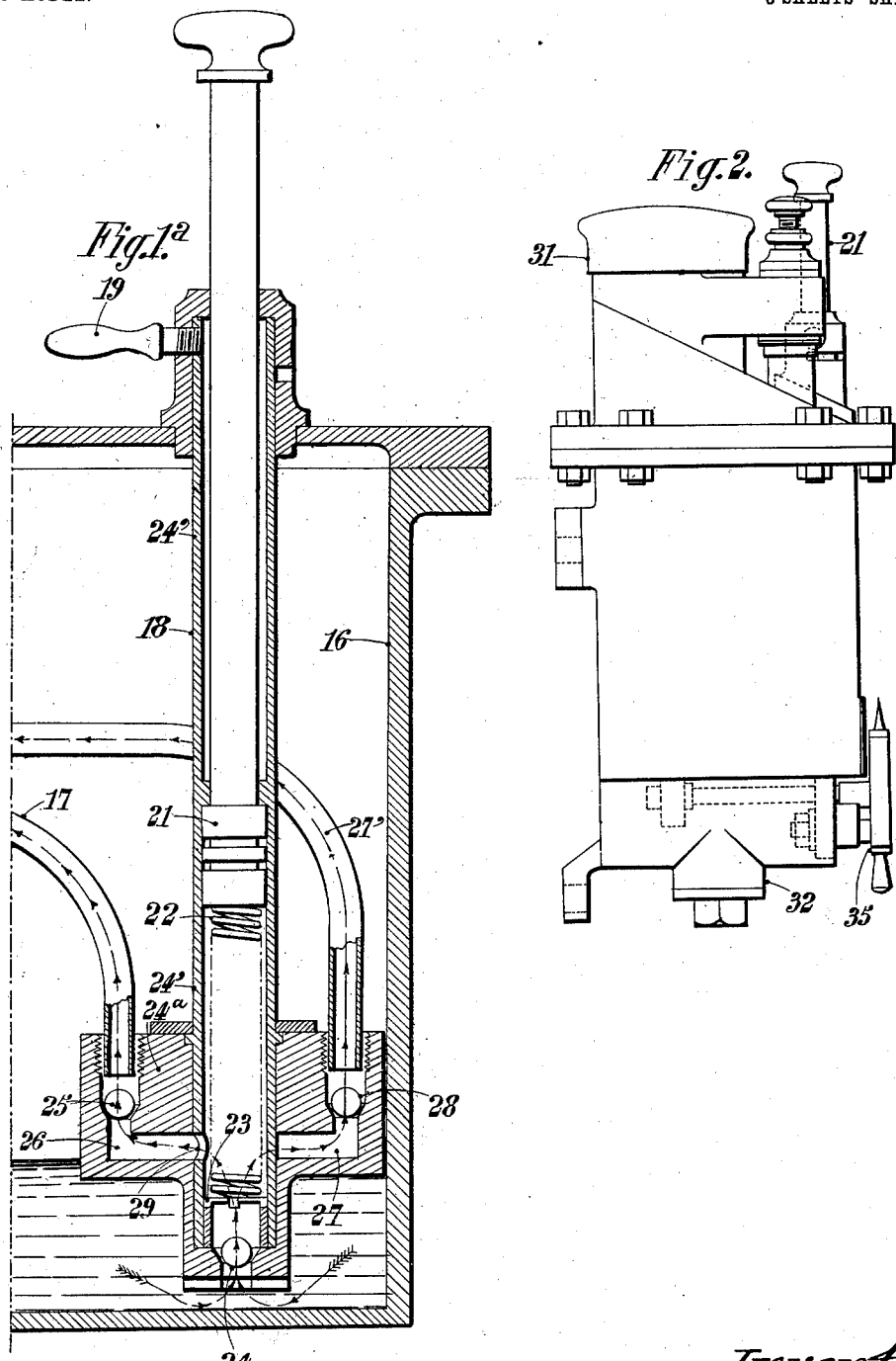
Figure 3:
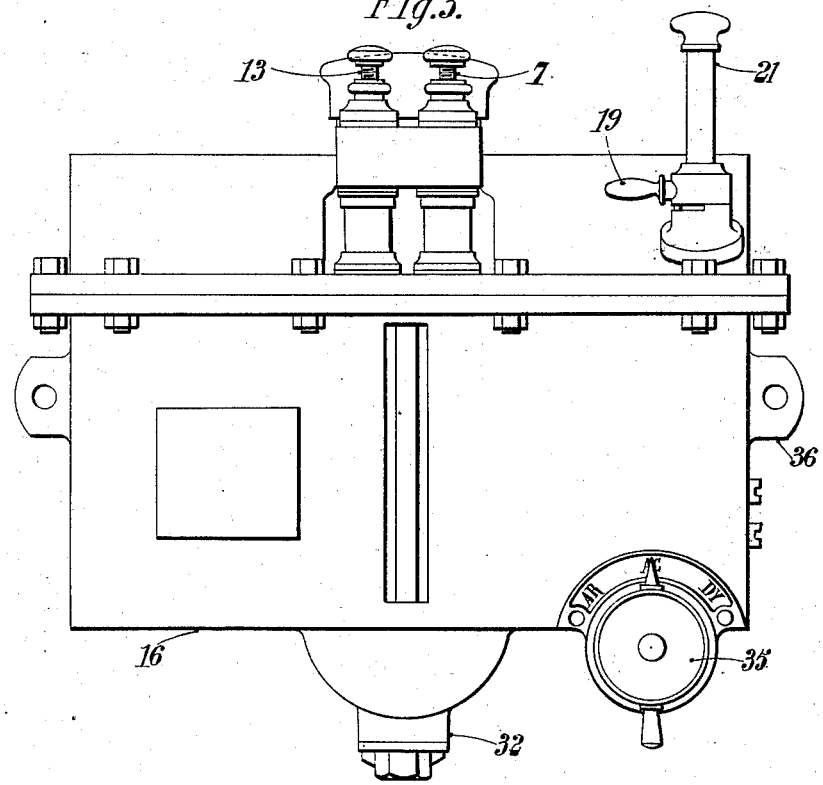
Figure 4:
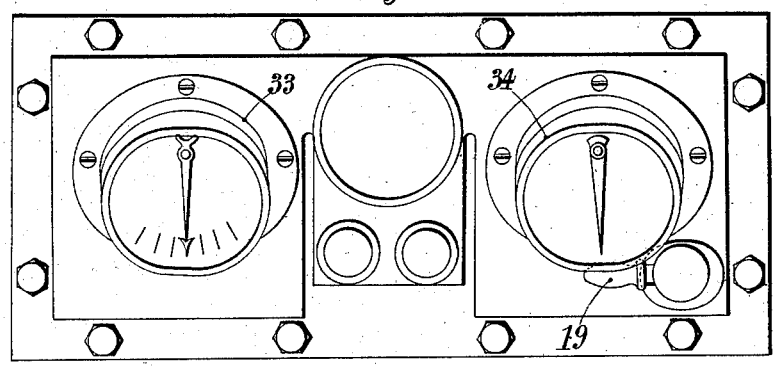

In the annexed drawings, Figures 1 and 1ª are collectively a diagrammatic section, in which all parts are represented as placed in the same plane in order that the device may be readily understood, said figures being placed on separate sheets, so as to permit illustration of the parts on a large scale. Figs. 2, 3, and 4 are respectively an end view, an elevation, and a top plan view, of the apparatus of such construction as to adapt it to be placed in front of the conductor near the motor, which may be assumed to be fitted in the front part of a vehicle. Figs. 2, 3, and 4 are on a smaller scale than Fig. 1. Contiguous to the lubricating apparatus are grouped the control apparatus, commutator, pressure-indicator, and manometer.

Like characters refer to like parts throughout the several figures.

The pipe 1 leads the exhaust-gases from the motor to the lubricating apparatus, where they operate on the under sides of two pistons 2 and 3. These pistons are located in suitably-disposed cylinders 2' and 3', respectively, and are held in their normal positions by suitable springs, as 4 and 5. Above the piston 2 is a check-valve 6, located in the path of the oil forced out of the cylinder by said piston, the supply of oil being derived from a drip-feed lubricator 7 through a pipe 8, shown as vertical. The check-valve 6, as well as other check-valves hereinafter described, is of the ball kind, although this is not essential.

The return of the oil through pipe 8 is prevented by the valve 9. A pipe 10 leads from the chamber of the valve 6 to the engine-cylinders. Above the piston 3 is a check-valve 11, surmounted by the vertical pipe 12, which opens at its upper end in the auxiliary reservoir 7', surrounding the drip-feed lubricators 7 and 13. This check-valve 11 prevents the oil from flowing back into the cylinder 3', which cylinder, it will be observed, is connected with the main oil-reservoir 16 by the pipe 14, inclosing the check-valve 15.

A pipe 17 is connected with the supply-pipe 10 above the check-valve 6 and is also connected with the hand-pump 18. The hand-pump 18 has a cylinder 24', which may be turned by means of a handle 19, swiveled in the casing 24ª. The piston 21 of this pump is normally held at the upper end of its stroke by a spring 22, shown as coiled, and the lower end of which rests upon a perforated plate 23. The check-valve 24 in the bottom of the casing 24ᵃ separates the cylinder 24' from the interior of the main reservoir 16, in which the casing 24ᵃ is suitably mounted, said cylinder 24' having an opening in its bottom for the passage of the oil. The pipe 17 leads from the chamber in which the check-valve 25 is situated, which chamber communicates with a passage 26, leading from the lower part of the cylinder 24'. A pipe 27' leads from a like chamber in which the check-valve 28 is located, the last-mentioned chamber being connected by a passage 27 with the lower part of the cylinder 24'. The cylinder of the hand-pump is provided with an outlet 29, which by turning said cylinder may be brought into registration with the inlets of either of the passages 26 or 27. The pipe 27' leads to the casing containing the change-gears.

The oil dropping from the drip-feed lubricator 13 is led to the bearing-blocks of the driving-shaft of the motor (not shown) by the pipe 30. The main reservoir 16 has a filling-opening 31 and a discharge-opening normally closed by a screw-plug 32.

The operation of the apparatus is as follows: The pulsations of the piston 2 under the action of the exhaust-gases entering the pipe or passage 1 cause said piston to suck up the oil dropping through the pipe 8 and cause the check-valve 9 to be opened. The oil thus sucked up is driven past the check-valve 6 into the pipe 10, through which it is led to the cylinders for lubricating the same. The piston 3 operates in like manner, and on its suction-stroke the check-valve 15 is opened to suck up the oil contained in the previously-filled main reservoir 16, and such oil is then forced through the pipe 12 into the auxiliary reservoir 7', so as to supply said auxiliary reservoir with the oil. The course of oil from the drip-feed lubricator 7 has been hereinbefore set forth, while the drip-feed lubricator 13 supplies oil through the pipe 30 directly to the bearing-blocks of the motor. If the operator places the handle 19 in the position shown in the drawings he may by operating the piston 24 increase the supply of oil to the engine-cylinders. Such oil under the action of the hand-pump in the manner just described is forced into the pipe 17 and is added to the oil furnished automatically by the piston 2. Ordinarily the oil supplied by the piston 2 is sufficient; but should at any time it be not so the requisite quantity can be supplied by the manipulation of the hand-pump. When sufficient oil has been supplied by way of the pipe 17 by the operation of the hand-pump, the cylinder 18 will be turned to put the opening 29 out of registration with the passage 26. Should it be necessary to supply oil to the change-gears, the opening 29 will be put into registration with the passage 27 and the pump operated to supply the oil to the change-gears by way of the pipe 27'. In Figs. 2, 3, and 4 the apparatus is arranged to be placed near the motor of a vehicle in front of the conductor. On the upper part of the apparatus may be conveniently placed a manometer 33 and a pressure-indicator 34. A commutator 35 regulates the electric igniting.

The reservoir 16 in practice may be provided with a plurality of lugs, as 36, three being shown, by which the same may be secured to any suitable support.

Having thus described my invention, what I claim as new, and desire to secure by Letters Patent, is—

1. In an apparatus of the class described the combination of a main oil-reservoir, a piston and its cylinder, a passage leading into the piston-cylinder for conducting the exhaust-gases thereto, the piston serving to draw oil from the main reservoir, a pipe for receiving the oil drawn by the piston from the reservoir, an auxiliary reservoir for receiving the oil from said pipe, a drip-feed lubricator connected with the auxiliary reservoir, a pipe for receiving the drip-feed oil, a second cylinder containing a piston, said last-mentioned pipe being in communication with the last mentioned cylinder, and the piston in the latter serving to pump the oil received from said last-mentioned pipe to a part to be lubricated, a passage opening into the last-mentioned cylinder for conducting exhaust-gases thereto to operate the piston therein, and valves for controlling the flow of the oil into and out of the cylinders.

2. In an apparatus of the class described, a reservoir, a hand-pump including a cylinder mounted for turning movement, a part mounted in the reservoir and receiving said cylinder, said part having an opening for the passage of the oil into said cylinder, and also having passages adapted to alternately register with said opening, and pipes leading from said passages to a part to be lubricated.

In testimony whereof I have hereunto set my hand in presence of two subscribing witnesses.

ARTHUR KREBS.

Witnesses:
 AUGUSTUS E. INGRAM,
 EMILE KLOTZ.